United States Patent [19]

Shepard

[11] Patent Number: 4,659,940
[45] Date of Patent: Apr. 21, 1987

[54] POWER GENERATION FROM HIGH ALTITUDE WINDS

[75] Inventor: David H. Shepard, Greenwich, Conn.

[73] Assignee: Cognitronics Corporation, Stamford, Conn.

[21] Appl. No.: 786,874

[22] Filed: Oct. 11, 1985

Related U.S. Application Data

[63] Continuation-in-part of Ser. No. 372,362, Apr. 28, 1982.

[51] Int. Cl.⁴ .............................................. F03D 3/02
[52] U.S. Cl. ......................................... 290/55; 290/44
[58] Field of Search .................. 290/44, 55; 415/5, 7; 416/7, 8, 84–86; 244/20, 153 A

[56] References Cited

U.S. PATENT DOCUMENTS

| | | | |
|---|---|---|---|
| 3,924,827 | 12/1975 | Lois | 290/55 X |
| 3,987,987 | 10/1976 | Payne et al. | 290/55 X |
| 4,076,190 | 2/1978 | Lois | 290/55 X |
| 4,084,102 | 4/1978 | Fry et al. | 290/55 |
| 4,166,596 | 9/1979 | Mouton, Jr. et al. | 290/55 X |
| 4,309,006 | 1/1982 | Biscomb | 290/55 X |
| 4,486,669 | 12/1984 | Pugh | 290/55 X |

Primary Examiner—William M. Shoop, Jr.
Assistant Examiner—W. E. Duncanson, Jr.
Attorney, Agent, or Firm—Parmelee, Bollinger & Bramblett

[57] ABSTRACT

There are disclosed method and apparatus for the production of electrical power from high altitude winds. A kitecraft (12) secured to a ground tether (14) supports a cylindrical drum (10) rotatable about a horizontal shaft (60). The drum comprises a plurality of wheels (24) interconnected by airfoils (26) positioned about the cylindrical surface of the drum. Wind action on the airfoils rotates the drum about the horizontal shaft and turns generators (50) to provide electrical power. The kitecraft (12) and drum (10) assembly is constructed to the maximum practical extent from tension members to reduce weight.

12 Claims, 9 Drawing Figures

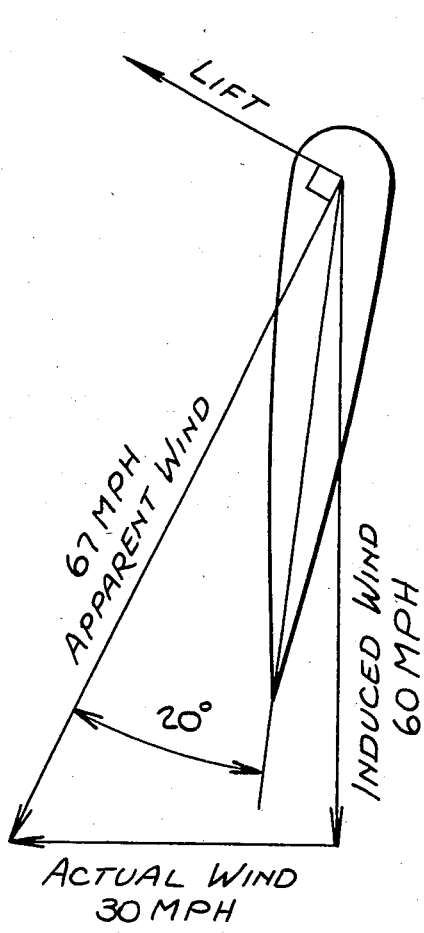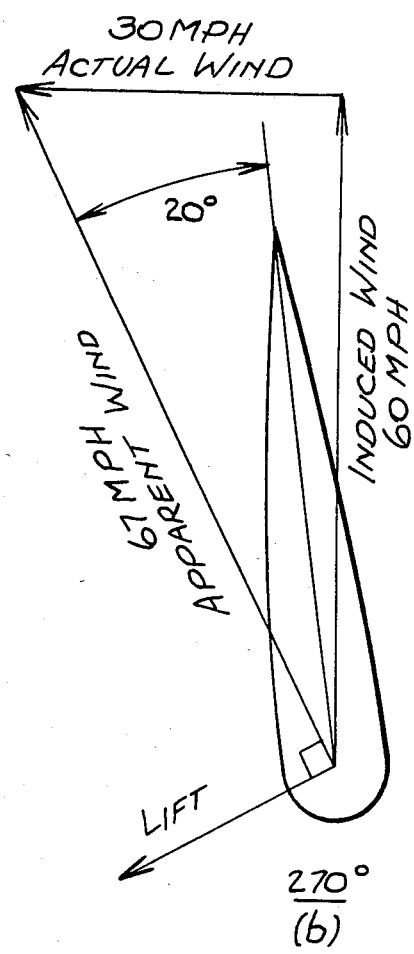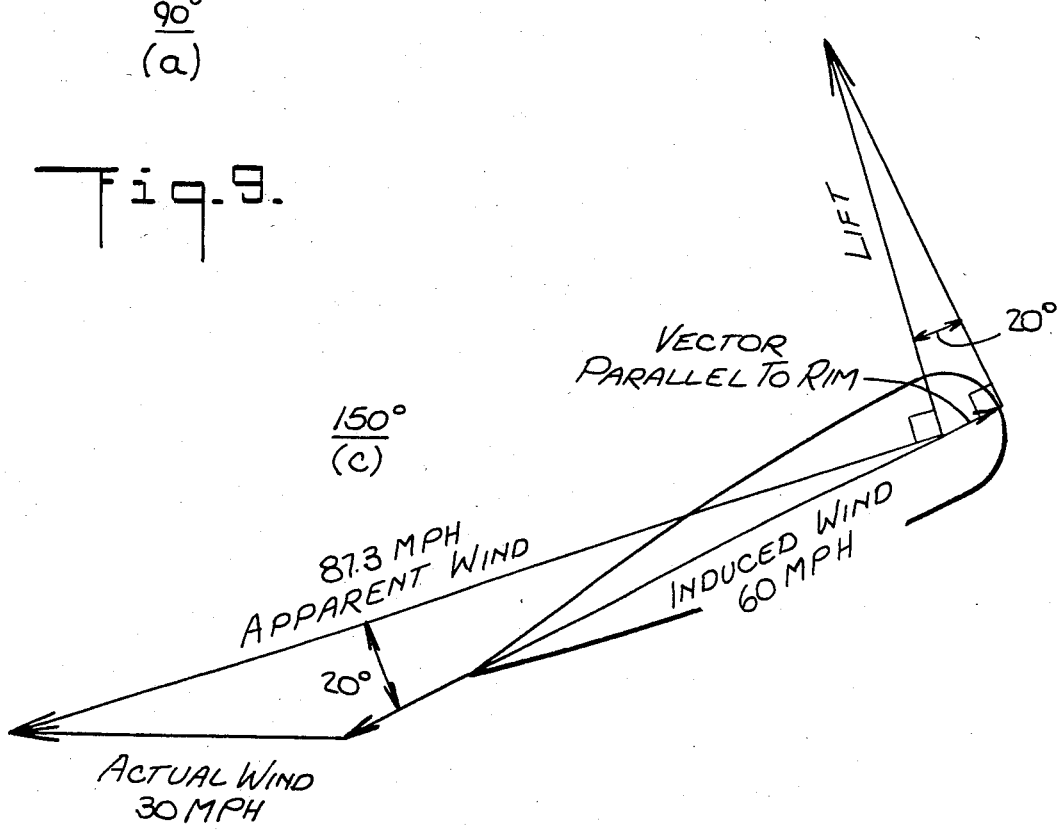
Fig. 9.

POWER GENERATION FROM HIGH ALTITUDE WINDS

TECHNICAL FIELD

This application is a continuation-in-part of my copending application Ser. No. 372,632 filed April 28, 1982 for "Apparatus for Extracting Energy from Winds at High Altitudes."

This invention relates to method and apparatus for extracting substantial electrical power from the wind. More particularly, this invention relates to extracting power from winds at altitudes too high for ground support such as, for example, between 200 and 40,000 feet above the surface of the earth.

BACKGROUND ART

The referenced copending application discloses and claims one approach to the production of electrical energy from high altitude winds. Specifically described therein is a kite-supported module which incorporates airfoil elements in an endless path around a pair of spaced shafts. The contents of that copending application are incorporated herein by reference.

As pointed out in the referenced copending application, many of the wind power projects suggested by the prior art are directed to extracting power from winds at ground level. These approaches have a basic shortcoming due to the relatively low power density and extreme variability in time and location of ground level winds. Typical of these approaches are wind axis "propeller" wind turbines and the cross axis Darrieus "eggbeater" wind turbines in wide use today on California and other wind farms.

The Darrieus unit employs a vertical shaft with two to five curved blades. Another cross axis approach is the "cyclogiro" which employs straight, adjustable pitch, airfoils rotating around a vertical axis. In theory, the cyclogiro wind turbine has the highest predicted power coefficients of all wind turbines (See Mark's *Standard Handbook for Mechanical Engineers*, eighth edition, pages 9-164 through 9-166).

In addition to the approach contained in the referenced copending application, other proposals have been made for extracting power from high level winds. These approaches are particularly attractive because the energy content of wind goes up as the cube of the wind velocity. One system is shown in U.S. Pat. No. 3,924,827 of Lois which discloses a series of buoyant wings connected by tethers to an electrical generator. The system is so arranged that, as one wing is being retracted, at least one other wing is being drawn away by the wind to deliver power to the generator.

Another proposal for high altitude wind power extraction is set forth in a paper entitled "Electricity Generation from Jet Stream Wind" by Fletcher and Roberts appearing in the July-August 1979 issue of *The Journal of Energy of the AIAA*. That paper proposes an airplane-like structure tethered to the ground and carrying wind turbines driving electric generators which deliver electrical current to the ground through two conductors forming part of the tether. The proposal involves flying the device at a relatively high altitude such as 12 kilometers.

The importance of the energy potential of high level winds may be derived from world wind data for 1979-80 available from The National Oceanic and Atmospheric Administration (NOAA). For example, at San Diego in midwinter of 1980, the average wind speed at 40,000 feet was almost 70 miles per hour, as opposed to about 8 miles per hour at sea level, 15 mph at 10,000 feet, 30 mph at 20,000 feet, and 45 mph at 30,000 feet. The available power increases with the cube of the wind velocity but decreases with air density. Set forth in the table below are theoretically available wind power figures in arbitrary relative units for San Diego for midwinter 1980 and midsummer 1979. Wind velocity figures vary widely with time and location, and at many other locations relative available wind power is typically higher at 30,000 feet than 40,000 feet.

| Altitude in feet | Relative Air Density | Midwinter Wind Velocity | Relative Power | Midsummer Wind Velocity | Relative Power |
| --- | --- | --- | --- | --- | --- |
| 0 | 1.0 | 8 | 1 | 8 | 1 |
| 10,000 | .74 | 15 | 5 | 6 | 0.5 |
| 20,000 | .53 | 30 | 28 | 10 | 1 |
| 30,000 | .37 | 45 | 66 | 20 | 6 |
| 40,000 | .25 | 70 | 167 | 35 | 20 |

It will be apparent from the foregoing table that winds aloft, especially at high altitudes, have significant potential for energy generation if that potential can be successfully harnessed.

Accordingly, it is a primary object of the present invention to provide improved method and apparatus for harnessing the potential of high altitude winds. Another object is to harness such energy by means of an efficient and relatively simple device which is readily positionable at the location and altitude for favorable wind conditions. Other objects, features, and advantages will be apparent from the following description and appended claims.

DISCLOSURE OF INVENTION

In accordance with the present invention, there is provided a drum-shaped apparatus rotatable about a horizontal axis and suspended from a suitable support structure, such as a kite. The cylindrical drum carries a of airfoils around its periphery which are positionable to generate drum-rotating lift in response to prevailing winds, and as such is probably properly classified as a horizontal axis cyclogiro. The rotation of the drum drives one or more electrical generators which supply electrical energy to the ground. The apparatus is connected to one or more ground tethers in a manner such that it automatically aligns itself with the prevailing winds.

BRIEF DESCRIPTION OF DRAWINGS

FIG. 7 is an enlarged profile of one of the airfoils of the invention.

FIG. 8 illlustrates an airfoil mounted and connected to restraining cables.

FIG. 9 comprises diagrams illustrating the operation of the invention.

BEST MODE FOR CARRYING OUT THE INVENTION

Figure 1:
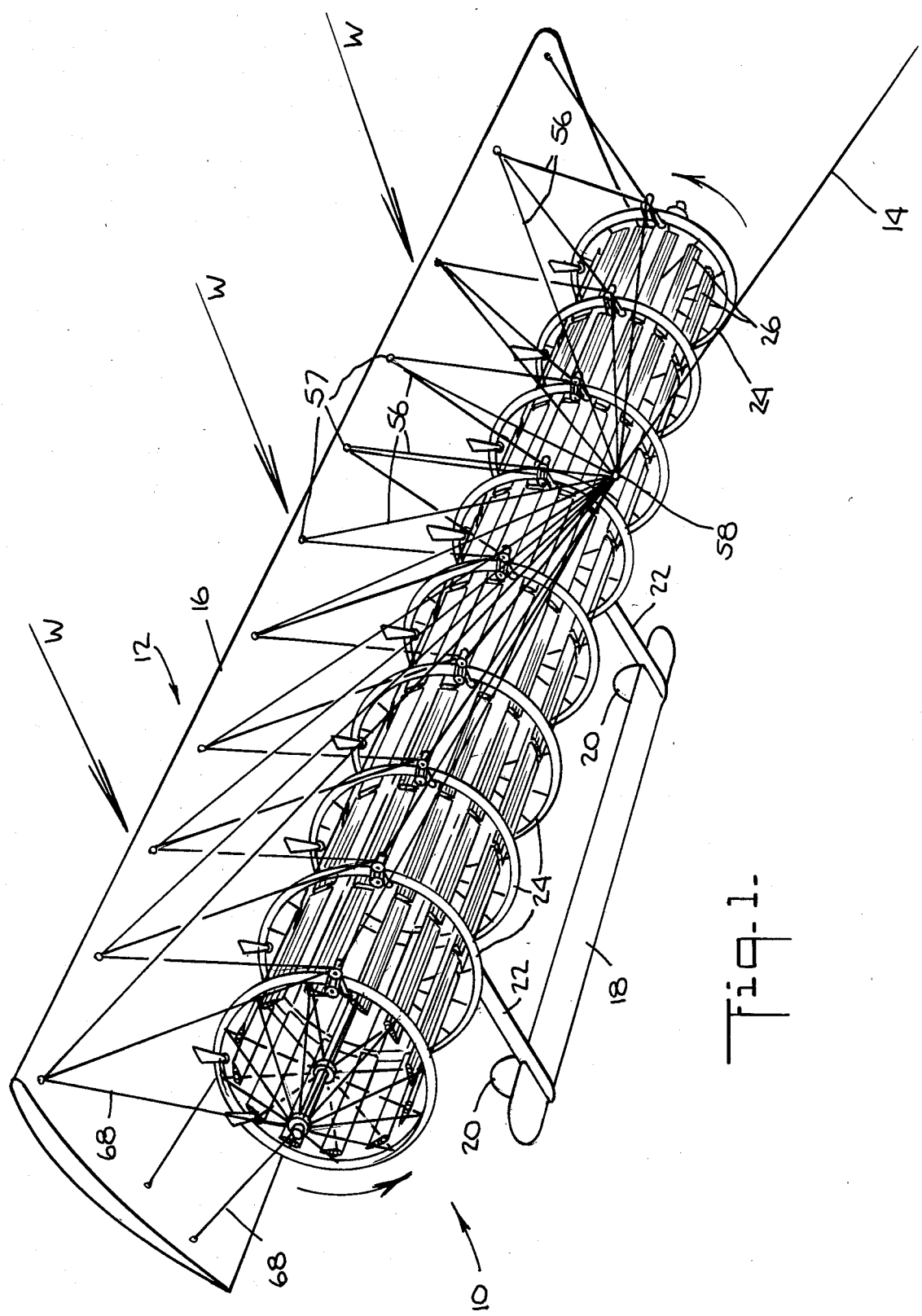
FIG. 1 is a perspective view of apparatus in accordance wiith the invention, illustrated at altitude.
Figure 3:
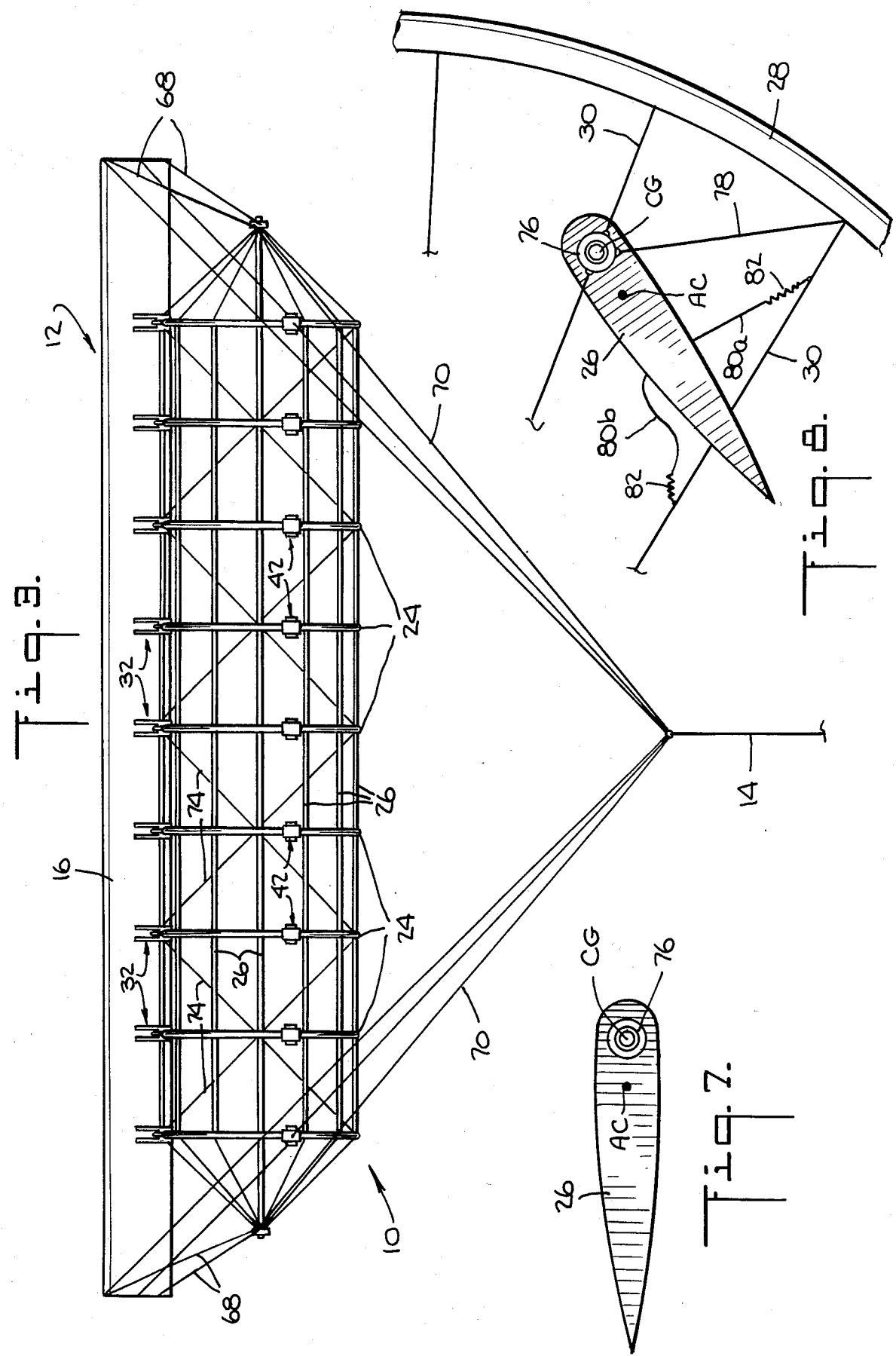
FIG. 3 is a front view of the apparatus of FIG. 1

With particular reference to FIG. 1, there is illustrated an apparatus in accordance with this invention comprising a cylindrical drum 10 suspended beneath a kitecraft 12, the whole being retained by a ground tether 14 so as to face into the wind, as indicated by the arrows W. The kitecraft 12 comprises a wing 16 which may have a conventional airfoil cross-section such as NACA 4415 and a tail assembly comprising a stabilator 18 and a pair of rudders 20 mounted at the end of a pair of twin booms 22 extending from the wing. The cylindrical drum which is suspended below the kitecraft comprises a plurality of wheels 24 which are spaced apart as illustrated in FIGS. 1 and 3 and interconnected by a plurality of airfoils 26 which essentially form the surface of a right circular cylinder.

In order to reduce the weight of the apparatus of the invention, it is constructed to the maximum possible extent from tension members. Accordingly, the wheels 24 are fashioned in much the same manner as bicycle wheels in that each comprises a relatively stiff rim 28 carrying spokes 30 which operate only under tension and may be lightweight cables.

Figure 5:
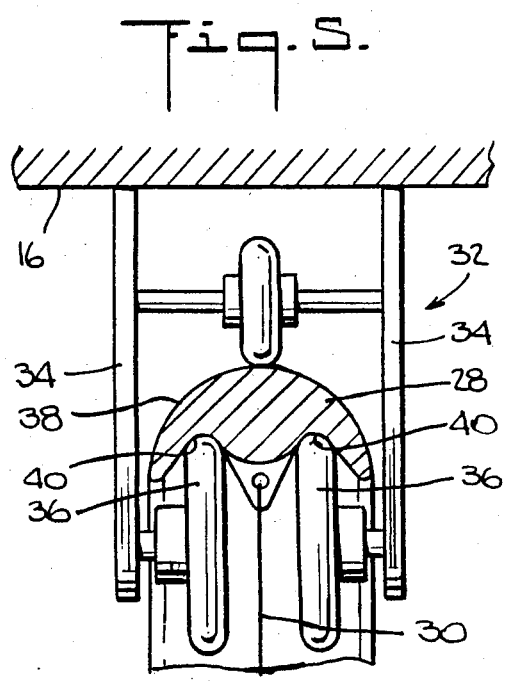
FIG. 5 is an enlarged cross-section taken substantially along the line 5—5 of FIG. 2

The drum 10 is suspended beneath the kitecraft 12 by means of a pair of support carriages 32 engaging each of the wheels 24. Each pair of support carriages depends, in fore to aft spaced relationship, from the wing 16. Each of these support carriages may include brackets 34 which carry a pair of rollers or tires 36 which engage the rim 28 of each of the wheels. The manner in which this is accomplished will be most apparent from FIG. 5 which shows the rim 28 in cross-section. The rim is streamlined by means of a convex outer periphery 38 in order to minimize turbulence in advance of the airfoils. The inner surface of the rim defines a pair of grooves 40 which receive the tires 36.

Figure 6:
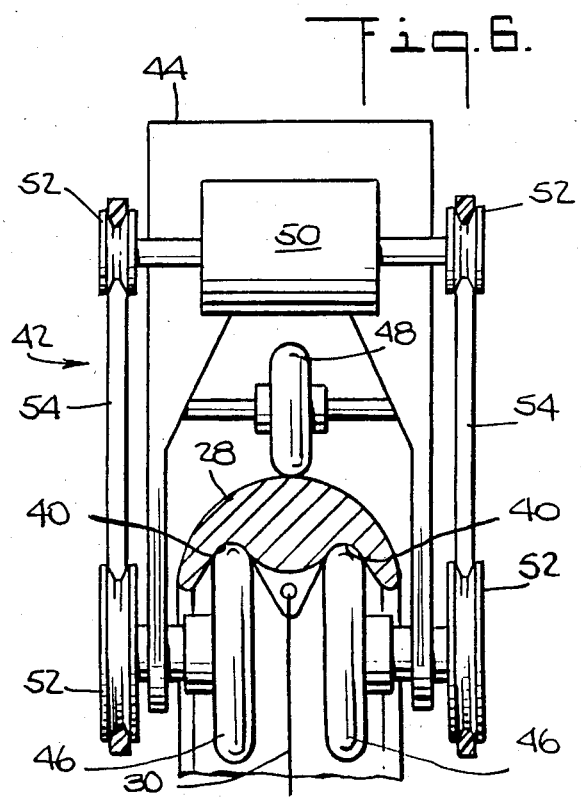
FIG. 6 is an enlarged cross-section taken substantially along the line 6—6 of FIG. 2.

Each of the wheels 24 making up the drum also engages a generator carriage 42. The generator carriages are similar in some respects to the support carriages 32 but are located on the ground tether, or windward, side of the drum 10 possibly, for example, 105 degrees clockwise from the top as viewed in FIG. 2. Each generator carriage includes a support member 44 with four tires 46, two rolling within each groove 40 on the innerside of the rim 28 of each wheel 24. As is seen most clearly in FIG. 6, the carriage also includes an idler tire 48 rolling upon the outer periphery of the rim 28. Idler 48 may be spring loaded to retain the tires 46 within the grooves. A generator 50 on each generator carriage 42 is driven by the tires 46 through pulleys 52 and V belts 54.

Figure 2:
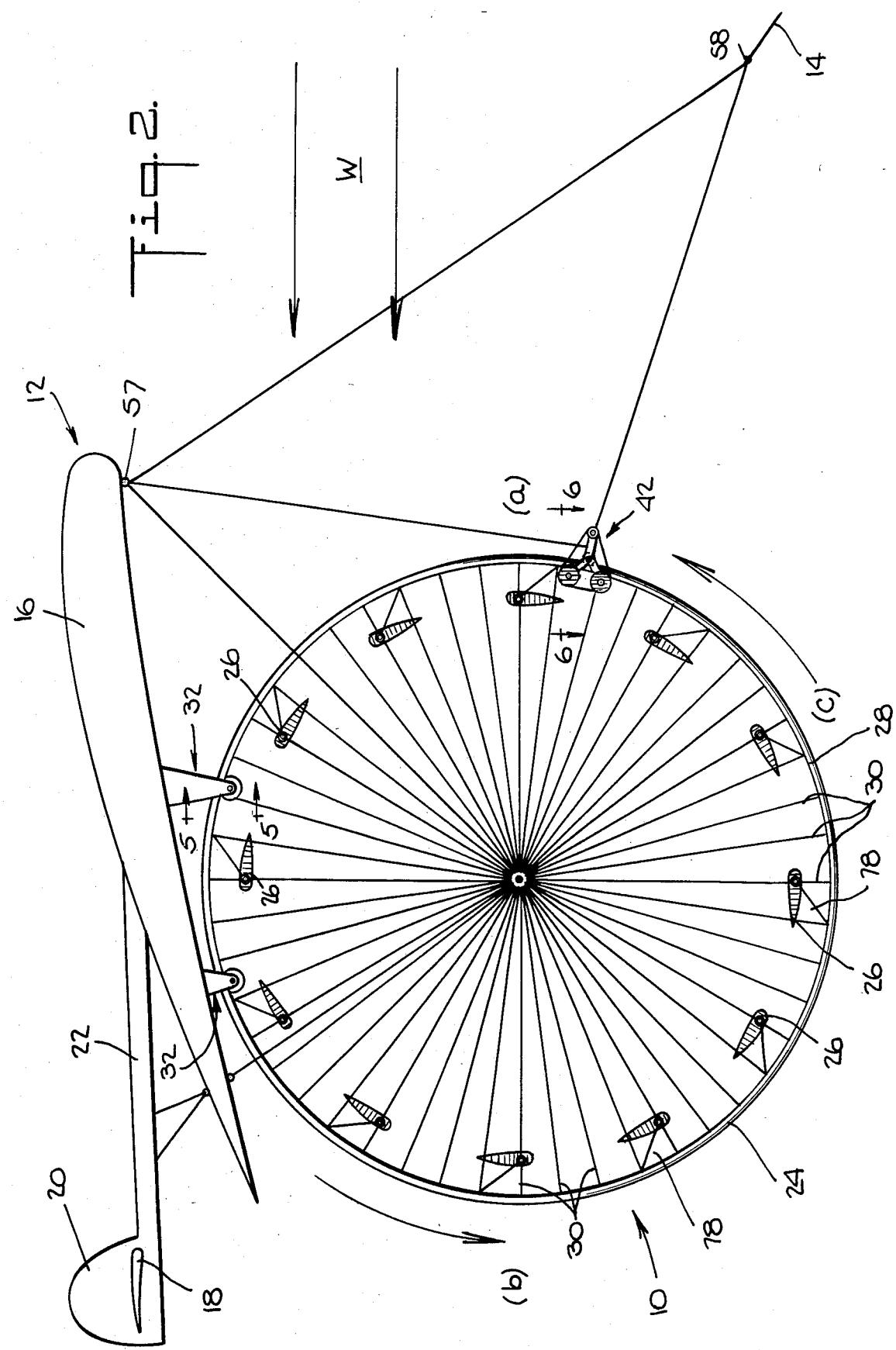
FIG. 2 is a side, elevational, view of the apparatus of FIG. 1.

The generator carriages 42 are secured in place by cable harnesses 56 (FIG. 1) having tie points 57 at the kitecraft wing 16 and tie point 58 at the ground tether 14. As seen in FIGS. 1 and 2, cables run from the generator carriages 42 to the kitecraft 12 and the ground tether 14. Cables from the kitecraft tie points 57 to the ground tether tie point 58 enable the kitecraft to maintain a reasonable tether angle in spite of the relatively high apparatus drag when power is being generated.

Figure 4:
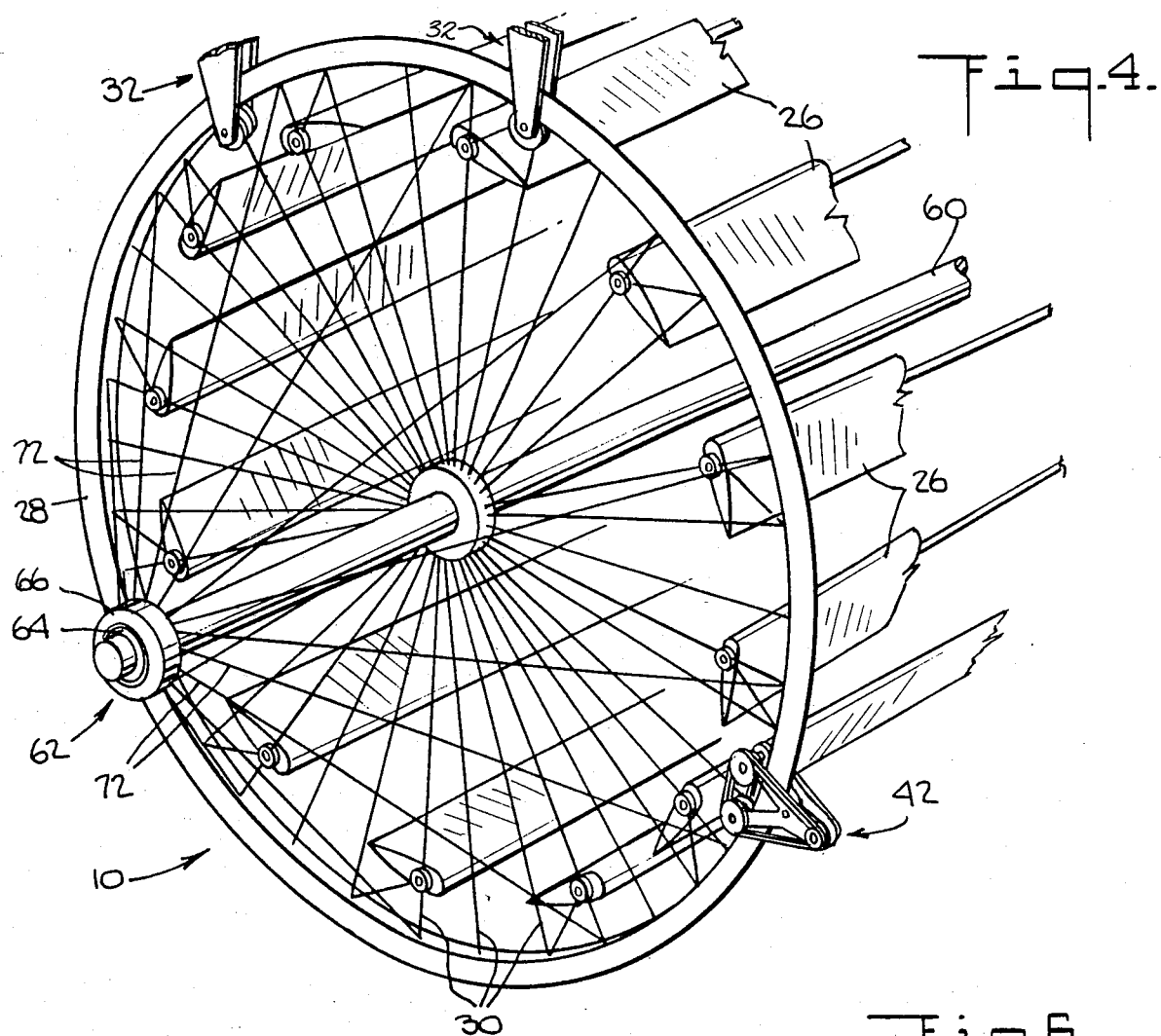
FIG. 4 is a detail of one of the end wheels forming a part of the invention.

A shaft 60 (FIG. 4) extends through the drum 10 and beyond the last wheel 24 on each end. The shaft carries a bearing 62 at each end. The inner race 64 of the bearing 62 is secured to the shaft while the outer race 66 is connected to the forward and aft wing tip by cables 68, and to the tether 14 by cables 70 (FIG. 3). The end of the shaft 60 adjacent the inner race 64 is also connected to the nearest wheel rim 28 by means of radial cables 72. These cables 72 maintain the length dimension of the drum 10 and skew and torsion of the drum are avoided by means of crisscross cables 74 (FIG. 3) between the wheels 24. Some of these crisscross cables are attached to the shaft, serving as well to keep it from buckling. In order to reduce drag, these cables may be made of a very thin but strong material such as, for example, Kevlar.

In order to simplify the drawing, the drum 10 is illustrated as having twelve airfoils 26. However, a greater or lesser number may also be employed. In an illustrative embodiment, each of these foils 26 has an NACA 0015 cross-section with a chord of approximately four feet. Except for slits at the spokes, each foil extends completely through the drum 10 but is mounted on, and rotatable about, aligned spokes 30 of the drum wheels 24 near the rims 28.

A typical foil profile is illustrated in FIG. 7. The foil 26 is designed with its heaviest structural members at the foil's leading edge such that the center of gravity (CG) is located forward of its aerodynamic center (AC). The foil 26 is connected to spokes 30 by pivots 76 (FIG. 8) at the foil's cross sectional center of gravity. A stiffening cable 78 extends from each pivot 76 to an adjacent spoke 30 to assist in transmitting rotational force to the rim 28. The aerodynamic center (AC) may be defined as the point about which the moment of the air forces remains constant when the angle of attack is changed. Since each foil is mounted to the spokes at its center of gravity, in the absence of wind, it will remain in any preestablished position. In the presence of wind, however, the foil will align itself with its aerodynamic center directly downwind from its center of gravity. This is an important feature because the wind itself may be used to orient the foils 26 into the proper attitudes for power generation. It is also important that the foils be mounted exactly at their centers of gravity in order that centrifugal forces do not affect their rotational positions.

In order for a foil to generate "lift," and therefore power, the foil must have a positive angle of attack relative to the apparent wind. There are various ways of obtaining this positive angle of attack including, for example, computerized motor control. However, one simple and effective method employs restraining cables 80a, b as illustrated in FIG. 8. Each cable incorporates a respective tension spring 82 and is connected between the trailing end of a foil 26 and an adjacent spoke 30. Cable 80a is connected to limit clockwise rotation of the foil as viewed in FIG. 8. It controls the attack angle of the foil on the windward side of the drum 10. Cable 80b limits counterclockwise rotation and controls attack angles on the leeward side of the drum 10. The spring force, cable lengths and cable attachment points to the spokes are selected to make the restraining force result in efficient angles of attack for the conditions under which the apparatus is to be operated. When a foil is thereby restrained and prevented from aligning itself directly into the apparent wind, a lift force will be generated from the resulting angle of attack. This lift force acts perpendicular to the direction of the apparent wind. As is true of most wind turbines, the greatest efficiency is achieved when the foils are travelling at a linear speed faster than that of the wind velocity. The component of the lift force perpendicular to the rim is thus larger than that along the rim. The force parallel to the rim would be unbalanced but, in the apparatus of this invention, as in other wind turbines, this force is counteracted by a generator. Maximum efficiency in the described embodiment is expected to be achieved with a rim speed of approximately twice wind speed.

In order to simplify the drawing, all the foils 26 shown in FIG. 2 are aligned parallel with rim 28. In actuality, good results may be achieved by holding the angle to within approximately 10 degrees of parallel. This may be best understood by referring to the vector diagrams of FIG. 9. These diagrams assume the apparatus of the invention to be flying in a 30 mile per hour wind the drum rotating at a speed of 60 miles per hour at the foils. It is also assumed that optimum lift for the airfoil in use is an angle of attack of 20 degrees when operating in the presence of other airfoils at the spacing shown. The diagrams illustrate the conditions existing at 3 points about the periphery of the drum 10 as viewed in FIG. 2. One diagram (a) illustrates conditions at the 90 degree position or directly to windward. A second (b) illustrates conditions at 270 degrees or directly to leeward and a third (c) illustrates conditions at 150 degrees, a position 30 degrees windward of bottom center. In each instance, the airfoil is shown with an angle of attack of 20 degrees into the apparent wind. The lift vector is not drawn to scale but illustrates the direction of lift, which is perpendicular to the apparent wind. In each instance, it will be noted that the direction of the lift vector is such as to include a component parallel to the rim in a direction to induce counterclockwise rotation about the central shaft. (In FIG. 9, the lift vector is elongated to more clearly illustrate its components.) At both the 90 degree and 270 degree positions, the angle of the airfoil is 6.6 degrees from a tangent to the rim of the wheel 24. At 150 degrees, it is within 0.1 degree of being tangential.

It will be understood by those skilled in the art, that the principles of this invention are applicable to devices of many sizes and power generating capabilities. However, a specific example may be considered. For example, if a drum is designed to have peak efficiency in a 30 mile per hour wind, it is believed that the optimum foil speed should be approximately 60 miles per hour or 88 feet per second. Considering a drum with the foils at a diameter of 50 feet, it can be readily calculated that the resulting centrifugal force will amount to 9.6 g. Assuming an airfoil 26 having a chord of 4 feet and weighing 2 pounds per lineal foot, the centrifugal force required to retain it will be 19.2 pounds per lineal foot of span. A spacing of 25 feet between the wheels 24 should provide little interference to the wind on the foils without requiring tremendous foil strength due to length of unsupported span.

Employing 12 airfoils as in the illustrated embodiment, it is estimated that the horizontal drag force at the generator carriages 42 would amount to approximately 3,400 pounds for each 25 foot drum section when power is being generated. Making allowance for the weight of the wheel rims 28, the foils, shaft, and cabling, the total weight per drum section would be approximately 1,100 pounds. Using these figures, it can be calculated that each of the generator carriage tires 46 would have a load of about 850 pounds. For an apparatus of this size, the wing 16 of the kitecraft could have a span of approximately 300 feet and a chord of 60 feet.

There are at least five situations in which it is undesirable to have the drum 10 rotating. These include:
1. during ascent;
2. during periods of high turbulence;
3. during periods of low wind when it is desired maintain altitude.
4. during descent, as when being towed in by a winch to prevent loss of tether tension during periods of very low wind; and
5. during potential or actual problems of malfunction aloft.

In all of these situations, the most suitable airfoil positions would be either at an angle of attack which will provide good lift with minimum drag or an angle that will give minimum drag and minimum lift.

If the drum 10 is rotating, the minimum drag, minimum lift status, may be achieved by releasing the tension on the restraining cables 80. This may be done, for example, by radio control. The wind will then cause the foils to assume their free floating position parallel to the wind and the drum 10 will stop rotating. The foils may then be locked in this position by radio control and the drum rotated, for example to 10 degrees, by the generators acting as motors to thereby position all the airfoils 26 into positions of vertical lift which would be additive to the lift of the overhead wing.

To activate drum rotation while aloft, the foils may be unlocked by radio control and rotation of the drum 10 started using the generators as motors. Each foil at some point in the cycle will become aligned parallel with the rims 28 and at this point tension is applied to the restraining cables 80. This will produce drum rotation and power generation.

The apparatus of this invention may be flown to altitude in the same manner as a kite. However, for jet stream power generation, if there is very little wind at lower altitudes, a propulsion device, either integral with, or separate from, the apparatus may be used to advantage to raise the apparatus to a height capable of maintaining tethered flight. By stopping rotation of the drum and setting the airfoils 26 for lift, as explained above, the drag due to power generation is eliminated, and with a device of the size described above, some 9,600 square feet of foil lift is added. This would provide lift-off at sea level at a wind speed of only about 13.5 miles per hour, but the corresponding altitude maintenance speed at 30,000 feet is about 22 mph because of the much lower air density.

The apparatus described above is relatively lightweight because its shape is maintained almost entirely by cables under tension, rather than by compression members. Furthermore, since the generators are driven from the rims 28 of the wheels, high speeds can be obtained, thereby permitting the use of light generators whose power to weight ratios vary with design operating speed. There is no need for gear boxes, a heavy item in some conventional wind turbines.

The described apparatus should be able to generate about 600 KW in a 30 mph wind at an altitude of 500 feet. Essentially the same apparatus with a rim speed of 100 mph should be able to generate one megawatt of power in a 50 mph wind at 30,000 feet.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. Apparatus for extracting energy from wind at high altitude, comprising:
   means for supporting a load at said high altitude;
   means for flexibly tethering said load supporting means to the surface of the earth;
   a plurality of elongated parallel airfoil elements supported by said load supporting means, said airfoil elements lying on the surface of an imaginary horizontal circular cylinder and rotatable about the horizontal axis of said cylinder in a closed cylindrical path;
   means for positioning said airfoil elements relative to said cylindrical surface whereby relative wind substantially normal to said axis exerts a force on said airfoil elements, causing said elements to rotate about said horizontal axis; and
   means responsive to the movement of said airfoil elements about said horizontal axis for transmitting power to the surface of the earth.

2. The apparatus of claim 1 wherein the airfoil element positioning means is adapted to alternatively position said elements in substantially fixed location about the surface of said cylinder with the aerodynamic lift of the airfoil elements adding to the support provided by the load supporting means.

3. The apparatus of claim 1 wherein said airfoil elements are secured to a plurality of wheels of substantially equal diameter suspended from said load supporting means, said wheels lying in substantially parallel planes spaced along the horizontal axis of said cylinder and rotatable about said horizontal axis.

4. The apparatus of claim 3 wherein:
   said positioning means pivotally secure the airfoil elements to the wheels whereby each airfoil element is rotatable about an attack-angle axis passing substantially through its center of gravity and substantially parallel to said horizontal axis.

5. The apparatus of claim 4 wherein said airfoil elements are substantially identical and wherein each said element has an aerodynamic center displaced downwind from its center of gravity.

6. The apparatus of claim 5 including means for pivotally positioning each of said airfoil elements about its center of gravity.

7. The apparatus of claim 6 wherein said pivotal positioning means comprises means for limiting the rotation of each said airfoil element.

8. The apparatus of claim 3 additionally comprising:
   at least one of said wheels having a circular rim defining a groove encircling its inner surface, and a smaller support wheel engaging and rollable in said groove with its axis secured to said load supporting means for suspending said wheel therefrom.

9. The apparatus of claim 8 wherein said rim defines a pair of axially spaced, coaxial grooves, and wherein at least one support wheel engages each of said grooves.

10. The apparatus of claim 3 wherein each of said wheels comprises:
    a hub;
    a substantially rigid rim; and
    a plurality of tension spokes interconnecting said hub and said rim.

11. The apparatus of claim 3 wherein at least one of said wheels has a circular rim defining a groove encircling its inner surface and said movement responsive means comprises:
    a smaller drive wheel engaging and rollable in said groove;
    an electrical generator; and
    means for transmitting power from said drive wheel to said generator.

12. The method of developing power from the wind at relatively high altitudes comprising:
    raising a load supporting assembly to a high altitude;
    tethering said load supporting assembly in a substantially fixed position relative to the earth;
    supporting with said assembly a plurality of elongated parallel airfoil elements lying on the surface of an imaginary horizontal circular cylinder and movable about the axis of rotation of said cylinder;
    moving said elements about said axis of rotation by wind action; and
    generating electrical power from the movement of said elements.

* * * * *